(12) United States Patent
Nimavat et al.

(10) Patent No.: US 12,260,303 B2
(45) Date of Patent: Mar. 25, 2025

(54) MACHINE LEARNING RANKING SYSTEM

(71) Applicant: Oracle International Corporation, Redwood Shores, CA (US)

(72) Inventors: Ketakee Kishorkumar Nimavat, Foster City, CA (US); Rajiv Kumar, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 1060 days.

(21) Appl. No.: 17/178,365

(22) Filed: Feb. 18, 2021

(65) Prior Publication Data

US 2022/0261688 A1   Aug. 18, 2022

(51) Int. Cl.
*G06F 3/0481* (2022.01)
*G06F 18/2113* (2023.01)
*G06F 18/214* (2023.01)
*G06F 18/22* (2023.01)
*G06N 20/00* (2019.01)

(52) U.S. Cl.
CPC ........... *G06N 20/00* (2019.01); *G06F 3/0481* (2013.01); *G06F 18/2113* (2023.01); *G06F 18/214* (2023.01); *G06F 18/22* (2023.01)

(58) Field of Classification Search
CPC ..... G06N 20/00; G06F 18/22; G06F 18/2113; G06F 18/214; G06F 3/0481
See application file for complete search history.

(56) References Cited

U.S. PATENT DOCUMENTS

| | | | | |
|---|---|---|---|---|
| 10,346,893 | B1 * | 7/2019 | Duan | G06N 3/08 |
| 10,614,345 | B1 * | 4/2020 | Tecuci | G06N 3/08 |
| 11,176,453 | B2 * | 11/2021 | Jiang | G06F 16/313 |
| 11,416,536 | B2 * | 8/2022 | Zhao | G06F 16/4387 |
| 11,689,486 | B1 * | 6/2023 | Bates | H04L 51/21 |
| | | | | 709/206 |
| 2020/0334260 | A1 * | 10/2020 | Kussmaul | G06F 3/0486 |
| 2021/0326390 | A1 * | 10/2021 | Aher | G06F 40/30 |

* cited by examiner

*Primary Examiner* — Beau D Spratt
(74) *Attorney, Agent, or Firm* — Invoke

(57) ABSTRACT

Techniques are disclosed for training a machine learning model to identify and rank entities relative to a set of requirements. The trained machine learning model may present an array of interface elements (e.g., icons) in a graphical user interface (GUI), where the interface elements represent corresponding entities. These interface elements are arranged in the GUI based on their corresponding ranks. The ranks of entities, and therefore the locations of corresponding interface elements are based, at least in part, on a degree of match between values of a subset of entity attributes and a corresponding subset of the set of requirements. The machine learning model may be further trained by receiving a user input that changes a location of a particular user interface element within the graphical user interface displaying the ranked user interface elements.

20 Claims, 6 Drawing Sheets

MACHINE LEARNING RANKING SYSTEM

TECHNICAL FIELD

The present disclosure relates to machine learning techniques. In particular, the present disclosure relates to ranking entities using a machine learning system and depicting ranked entities in a graphical user interface.

BACKGROUND

Machine learning involves techniques through which computing systems make inferences and adjustments during runtime rather than relying on static instruction sets to perform tasks. Machine learning has a wide range of applications, such as tuning search engine results, diagnosing medical conditions, recognizing images, recommending relevant items, forecasting resource utilization, responding to natural language inputs through virtual assistants, and improving autonomous driving vehicles, among several others.

In many applications, a training data set of content items is processed to train a machine learning (ML) model prior to using the trained ML model to analyze a new content item. For example, a training data set of documents may include entity profiles that include attributes, attribute values, and an indication of whether the attribute values in a particular profile are aligned with a set of requirements. An ML model may then be applied to new material to determine whether (or to what extent) a new entity profile matches the set of requirements.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. ATTRIBUTE BASED RANKING AND GRAPHICAL USER INTERFACE PRESENTATION SYSTEM
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

One or more embodiments apply a trained machine learning model trained to filter and rank entities relative to a set of requirements. The trained machine learning model may first filter entities using a first type of score (an "overall" match score). The trained machine learning model may then rank the filtered entities using a second type of score (a "ranking" match score). The system may present interface elements corresponding to the filtered and then ranked entities in a graphical user interface (GUI). The system may arrange the interface elements in the GUI based on the ranking match scores that correspond to the entities represented by the various interface elements. The ranking scores are based, at least in part, on a degree of match between values of a subset of entity attributes and a corresponding subset of the set of requirements.

The calculation of the ranking match scores may be revised by receiving a user input that changes the order of the ranked interface elements. Altering the order of the ranked interface elements may cause the system to identify a different subset of attributes and/or attribute weights by which the various ranking match scores are generated. The system may then update training data to reflect the re-ordered user interface elements and retrain the machine learning model.

One or more embodiments described in this Specification and/or recited in the claims may not be included in this General Overview section.

2. Architectural Overview

Figure 1:
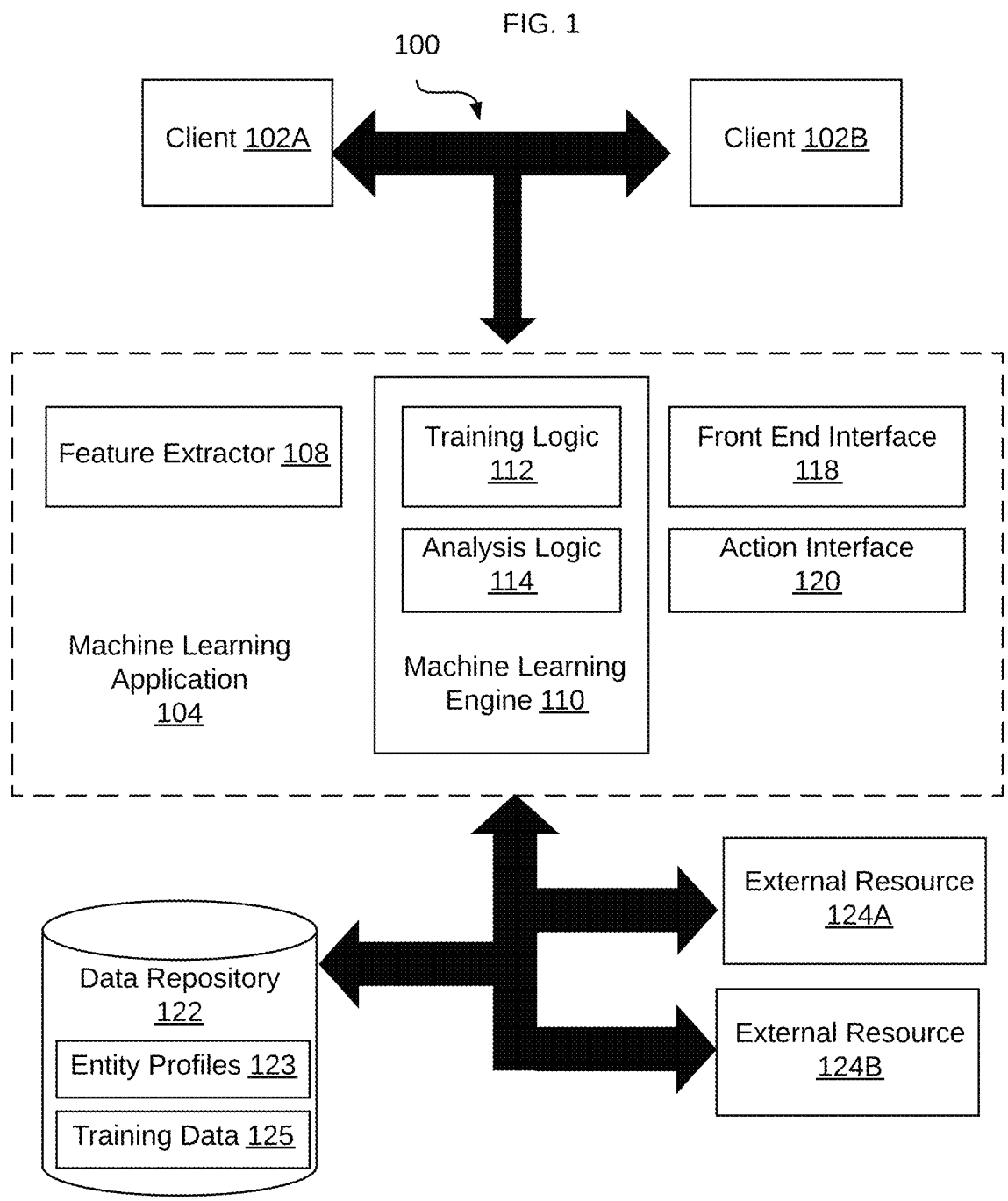
FIG. 1 illustrates a system in accordance with one or more embodiments.

FIG. 1 illustrates a system 100 in accordance with one or more embodiments. As illustrated in FIG. 1, system 100 includes a machine learning system for presenting a graphical user interface (GUI) of a filtered subset of user interface elements in a ranked order. The system 100 may also include elements for updating a training data set based on user input that reorders the user interface elements within the ranked order. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

As illustrated in FIG. 1, system 100 includes clients 102A, 102B, a machine learning application 104, a data repository 122, and external resources 124A, 124B.

The clients 102A, 102B may be a web browser, a mobile application, or other software application communicatively coupled to a network (e.g., via a computing device). The clients 102A, 102B may interact with other elements of the system 100 directly or via cloud services using one or more communication protocols, such as HTTP and/or other communication protocols of the Internet Protocol (IP) suite.

In some examples, one or more of the clients 102A, 102B are configured to submit a set of requirements to the ML application 104. The ML application 104 may use the submitted requirements to generate different types of scores between attributes of various entities. The ML application 104 may then use one or more of the different types of scores to generate entity ranks and a GUI ranked array of user interface elements corresponding to the entity ranks, as described herein.

The clients 102A, 102B may also include a user device configured to render a graphic user interface (GUI) generated by the ML application 104. The GUI may present a ranked array of one or more entity user interface elements that, prior to the ranking, have been filtered from a set of entities. Furthermore, the clients 102A, 102B may be configured to enable a user to reposition one or more entity user interface elements within a ranked array. This feature enables a user to provide new data to the ML application 104, which may use the new data for training.

In some examples, the machine learning (ML) application 104 is configured to receive training data. Once trained, the ML application 104 may (1) calculate overall match scores for corresponding entities based on an analysis of a set of entity attribute values compared to corresponding requirements in a set of requirements and (2) calculate ranking match scores that are based on a subset of entity attributes and compared to a subset of requirements from the set of requirements. The ML application 104 may use the ranking match score to select an order of a subset of interface elements (filtered from a set using the overall match scores) within the ranked array displayed in the GUI.

Furthermore, the ML application 104 is also configured to receive user input that re-orders the ranked array of user interface elements. The ML application 104 may use the re-ordered ranked array as additional training data that is used to re-train an ML engine within the ML application 104. In some embodiments, ML application 104 may be locally accessible to a user, such as a desktop or other standalone application or via clients 102A, 102B as described above.

In one or more embodiments, the machine learning application 104 refers to hardware and/or software configured to perform operations described herein for ranking entities and receiving user input via a GUI that, in turn, is used to re-train the machine learning application 104. Examples of operations for these processes are described below with reference to FIG. 2.

The machine learning application 104 includes a feature extractor 108, a machine learning engine 110, a frontend interface 118, and an action interface 120

The feature extractor 108 may be configured to identify attributes and corresponding values in data sets and generate corresponding feature vectors. For example, the feature extractor 108 may identify entity attributes within training data and/or "target" data that a trained ML model is directed to analyze. Once identified, the feature extractor 108 may extract attribute values from one or both of training data and target data.

The feature extractor 108 may tokenize attributes (e.g., entity attributes) into tokens. The feature extractor 108 may then generate feature vectors that include a sequence of values, with each value representing a different attribute token. The feature extractor 108 may use a document-to-vector (colloquially described as "doc-to-vec") model to tokenize attributes and generate feature vectors corresponding to one or both of training data and target data.

The feature extractor 108 may append other features to the generated feature vectors. In one example, a feature vector may be represented as $[f_1, f_2, f_3, f_4]$, where $f_1, f_2, f_3$ correspond to attribute tokens and where $f_4$ is a non-attribute feature. Example non-attribute features may include, but are not limited to, a label quantifying a weight (or weights) to assign to one or more attributes of a set of attributes described by a feature vector. In some examples, a label may quantify an extent of a match between a set of requirements and a feature vector associated with a particular entity (whether found in target data or training data). In some examples, the label may correspond to a binary value that indicates whether or not a set of one or more attributes matches a set of one or more requirements.

In some examples, one or more labels may quantify an extent of a match between a particular entity attribute and a corresponding particular requirement in a set of requirements. In other examples, one or more labels may quantify an extent of a match between a subset of entity attributes and a subset of corresponding requirements in the set of requirements. In this way, the system may be trained, re-trained, and applied to new (target) data using more precise subsets of attributes and corresponding requirements. This feature enables the system to execute an analysis that is focused on an extent of matching between subsets of attributes and corresponding requirements. In some examples, training and applying the system using subsets of attributes and corresponding requirements may cause the system to generate more precise results compared to using the entire sets of attributes and/or requirements. The subset of entity attributes and corresponding subset of requirements may be selected by the user, thereby enabling the system to present a ranked array of interface elements that is based on the subset of requirements most interesting to the user.

The feature extractor 108 may optionally be applied to target data to generate feature vectors from target data, which may facilitate analysis of the target data.

The machine learning engine 110 further includes training logic 112, analysis logic and 114.

In some examples, the training logic 112 receives a set of electronic files as input (i.e., a training corpus or training data set). Examples of electronic documents include, but are not limited to, electronic entity files that include entity attributes and corresponding entity attribute values. In some examples, training data used by the training logic 112 to train the machine learning engine 110 includes feature vectors of entity files that are generated by the feature extractor 108, described above.

A training data set may also include a set of requirements, such as desired attribute value ranges, maximum attribute values, minimum attribute values, and/or attribute weights.

These requirements may also be represented as feature vectors. A training data set may also include one or more labels that identify a degree of match between the attribute values associated with a particular entity and a corresponding set of requirements. This degree of match is otherwise referred to as an "overall match score" herein. In some examples, the overall match score may be a binary value of "matching" or "not matching." As explained below, the overall match score may be used to filter entities. In one example, entities in a set of entities that are associated with an overall match score above a threshold value are selected as a subset of entities. The system omits entities having an overall match score below the threshold value.

In some examples, the training data set may include a score that represents a degree of matching between a subset of attributes and a subset of requirements that corresponds to the subset of attributes. The degree of matching between these corresponding subsets is referred to herein as a "ranking match score." The overall match score may be beneficial for ranking entities as a whole relative to the requirements as a whole. As described above, the system may then use the overall match score to filter entities from a set of entities. The system may further analyze entities having an overall match score above a threshold value according to different criteria, such as a ranking match score.

The ranking match score, using the subsets of attributes and corresponding subset of requirements, enables the system to rank entities based on narrower and/or more focused criteria compared to the overall match score. For example, the system may use an overall match score to identify a subset of relevant entities (e.g., in response to an analysis, search, and/or filter) whereas the ranking match score may enable this subset of relevant entities to be evaluated against a narrower set of criteria (e.g., fewer requirements) that may be of greater relevance or greater interest to a user. In this way, the system may use the ranking match score to rank entities relative to the subset of requirements.

When employed as training data, the ranking match score may be used to rank entities relative to the subset of corresponding requirements. The combination of ranking match score, subset of attribute values, and subset of requirements may be used to train a machine learning model. When a trained machine learning model is applied to new "target" data, changes to an order of interface elements may in turn prompt the system to recompute the ranked match scores (e.g., by altering weights of attributes in the subset of attributes). The system may use the recomputed ranking match scores as training data to retrain the ML model.

The training logic 112 may be in communication with a user system, such as clients 102A, 102B. The clients 102A, 102B may include an interface used by a user to apply labels to the electronically stored training data set.

The machine learning (ML) engine 110 is configured to automatically learn, via the training logic 112, a relative importance of various attributes. In some examples, the ML engine 110 may generate an overall match score corresponding to the overall matching between the attributes and a set of requirements. In some examples, the ML engine 110 may generate a ranking match score (for a subset of entities filtered using the overall match score) corresponding to the extent of matching between a subset of attributes and a corresponding subset of requirements. The relative importance of various attributes may be represented as corresponding attribute weights so that a weighted average (or sum or other mathematical output) of the various attributes may be used to generate a ranking match score. The ML engine 110 may also identify these attributes and their relative proportions within target data.

The ML engine 110 may generate a graphical user interface presenting a ranked array of individual user interface elements corresponding to the analyzed, ranked, and in some cases, filtered target data. Furthermore, the ML engine 110 may also update training data upon receiving user input that manually re-orders user interface elements within the graphical user interface. More specifically, as described below in more detail, the ML engine 110 may receive changes to a location of one or more user interface elements within the ranked array of user interface elements. Based on the received changes to location, the ML engine 110 (via the analysis logic 114) may identify and adjust attribute weights in training data.

The analysis logic 114 applies the trained machine learning engine 110 to analyze target data, such as entity profiles stored in an entity profile store 123 of the data repository 122. Target entity profile data may include one or more attributes and corresponding attribute values (whether in toto or in a subset of attributes). The entity attributes and attribute values may be analyzed by the analysis logic 114 for similarities to the training data describe above. The analysis executed by the analysis logic 114 may include generating one or both of an overall match score and a ranking match score between an entity (and its attributes) and a set of requirements.

In one example, the analysis logic 114 may identify equivalent and/or comparable attributes between one or more entities and the training data and/or the set of requirements. In some examples, the analysis logic 114 may include facilities for natural language processing so that comparable attributes in entity profiles and training data may be identified regardless of differences in wording. Examples of natural language processing algorithms that the analysis logic 114 may employ include, but are not limited to, document term frequency (TF), term frequency-inverse document frequency (TF-IDF) vectors, transformed versions thereof (e.g., singular value decomposition), among others. In another example, feature vectors may also include topic model based feature vectors for latent topic modeling. Examples of topic modeling algorithms include, but are not limited to, latent Dirichlet allocation (LDA) or correlated topic modeling (CTM). It will be appreciated that other types of vectors may be used in probabilistic analyses of latent topics.

Once the analysis logic 114 identifies attributes (or a subset of attributes) in target data and corresponding attributes (or a subset) and attribute weights in training data, the analysis logic 114 determines a similarity between the target data attributes and the training data. For example, the analysis logic 114 may execute a similarity analysis (e.g., cosine similarity) that generates an overall match score quantifying a degree of similarity between target data and training data. The analysis logic may execute an analysis to generate a ranking match score quantifying a degree of similarity between a subset of target data attributes and a corresponding subset of attributes within the training data. One or more of the attributes that form the basis of the comparison between the training data and the target data may be weighted according to the relative importance of the attribute as determined by the training logic 112. The comparison and the relative weights may be used to generate one or both of an overall match score and/or a ranking match score for a particular entity that is based on a similarity with training data, entity attribute values, and weights corresponding to entity attributes.

The frontend interface 118 manages interactions between the clients 102A, 102B and the ML application 104. In one or more embodiments, frontend interface 118 refers to hardware and/or software configured to facilitate communications between a user and the clients 102A,102B and/or the machine learning application 104. In some embodiments, frontend interface 118 is a presentation tier in a multitier application. Frontend interface 118 may process requests received from clients and translate results from other application tiers into a format that may be understood or processed by the clients.

For example, one or both of the client 102A, 102B may submit requests to the ML application 104 via the frontend interface 118 to perform various functions, such as label training data and/or analyze target data. In some examples, one or both of the clients 102A, 102B may submit requests to the ML application 104 via the frontend interface 118 to view a graphic user interface of a ranked array of interface elements corresponding to entities. In still further examples, the frontend interface 118 may receive user input that re-orders individual interface elements.

Frontend interface 118 refers to hardware and/or software that may be configured to render user interface elements and receive input via user interface elements. For example, frontend interface 118 may generate webpages and/or other graphical user interface (GUI) objects. Client applications, such as web browsers, may access and render interactive displays in accordance with protocols of the internet protocol (IP) suite. Additionally or alternatively, frontend interface 118 may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

In an embodiment, different components of the frontend interface 118 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the frontend interface 118 is specified in one or more other languages, such as Java, C, or C++.

The action interface 120 may include an API, CLI, or other interfaces for invoking functions to execute actions. One or more of these functions may be provided through cloud services or other applications, which may be external to the machine learning application 104. For example, one or more components of machine learning application 104 may invoke an API to access information stored in data repository 122 for use as a training corpus for the machine learning engine 104. It will be appreciated that the actions that are performed may vary from implementation to implementation.

In some embodiments, the machine learning application 104 may access external resources, such as cloud services. Example cloud services may include, but are not limited to, social media platforms, email services, short messaging services, enterprise management systems, and other cloud applications. Action interface 120 may serve as an API endpoint for invoking a cloud service. For example, action interface 120 may generate outbound requests that conform to protocols ingestible by external resources.

Additional embodiments and/or examples relating to computer networks are described below in Section 5, titled "Computer Networks and Cloud Networks."

Action interface 120 may process and translate inbound requests to allow for further processing by other components of the machine learning application 104. The action interface 120 may store, negotiate, and/or otherwise manage authentication information for accessing external resources. Example authentication information may include, but is not limited to, digital certificates, cryptographic keys, usernames, and passwords. Action interface 120 may include authentication information in the requests to invoke functions provided through external resources.

In one or more embodiments, a data repository 122 is any type of storage unit and/or device (e.g., a file system, database, collection of tables, or any other storage mechanism) for storing data. Further, a data repository 122 may include multiple different storage units and/or devices. The multiple different storage units and/or devices may or may not be of the same type or located at the same physical site. Further, a data repository 122 may be implemented or may execute on the same computing system as the ML application 104. Alternatively or additionally, a data repository 122 may be implemented or executed on a computing system separate from the ML application 104. A data repository 122 may be communicatively coupled to the ML application 104 via a direct connection or via a network.

Information describing entities, entity attributes, and the training data may be implemented across any of components within the system 100. However, this information is illustrated within the data repository 122 for purposes of clarity and explanation. As illustrated in FIG. 1, entity profiles that store attributes and corresponding attributes values for one or more corresponding entities are stored in entity profile store 123. Training data, as described above, is stored in training data store 125.

In one or more embodiments, the ML application 104 and/or system 100 refers to hardware and/or software configured to perform operations described herein for generating a ranked array of user interface elements corresponding to entities using machine learning. The ML application 104 and/or system 100 also refers to processes for updating a ranking analysis (e.g., attribute weights) based on user-received re-ordering of graphical interface elements corresponding to the entities. Examples of operations for these processes are described below with reference to FIG. 2.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Attribute Based Ranking and Graphical User Interface Presentation System

Figure 2:
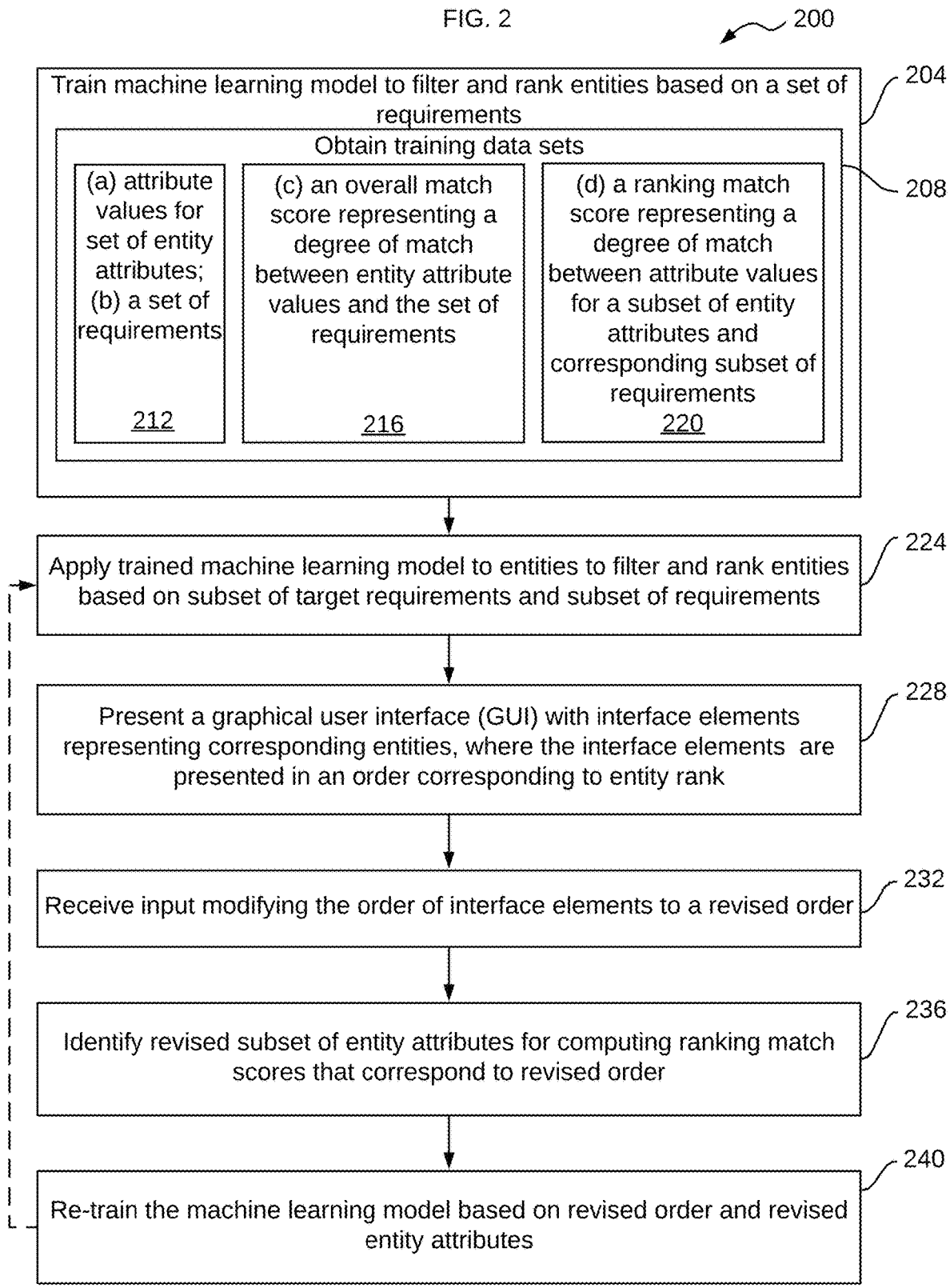
FIG. 2 illustrates an example set of operations for generating a ranked array of entities based on an analysis of particular subsets of attributes of entity profiles and presenting the analysis in a graphical user interface in accordance with one or more embodiments.

FIG. 2 illustrates an example set of operations, referred to collectively as a method 200, for generating and rendering a ranked array of user interface elements, where individual user interface elements correspond to individual entities in accordance with one or more embodiments. Elements of the method 200 depicted in FIG. 2 are associated with filtering and ranking entities and displaying interface elements corresponding to the associated rankings. Specifically, the system uses an overall match score generated by a trained ML model to filter a set of entities, thereby generating a subset of entities. The system uses a ranking match score generated by a trained ML model to rank the subset of entities and arrange corresponding interface elements in a GUI. The system may generate ranking match scores by analyzing a subset of entity attributes for the subset of entities in light of a corresponding subset of requirements. Furthermore, some elements of the method 200 are associated with updating a training data set with user input that re-orders one or more of the user interface elements within the ranked list. One or more operations illustrated in FIG. 2 may be modified, rearranged, or omitted all together. Accordingly, the particular sequence of operations illustrated in FIG. 2 should not be construed as limiting the scope of one or more embodiments.

The method 200 begins by training a machine learning model to generate (or equivalently, compute) overall match scores and ranking match scores by comparing entity attribute values to a set of requirements, and subsets thereof (operation 204). The system may initiate the training of operation 204 by first obtaining training data sets (operation 208). In some examples, the training data sets may be electronically stored profiles that identify entity attributes, corresponding attribute values, and requirements. In other examples, a training data set may include target data that has been analyzed and rendered in a GUI as interface elements according to the method 200, and which have been re-ordered by user input.

More specifically, in some examples training data may include a number of constituent data types that the system uses to train the ML model. For example, a training data set for an entity (or equivalently, multiple training data sets for corresponding entities) may include one or more of the following: (a) a set of entity attributes, corresponding attribute values, and a set of requirements (operation 212); (b) an overall match score representing a degree of matching between entity attribute values and corresponding requirements in the set of requirements (operation 216); and (c) a ranking match score (operation 220). As described below, the ranking match score represents a degree of matching between a subset of entity attribute values (for a subset of entities filtered from a set of entities based on an overall match score) and a corresponding subset of requirements.

The term "entities" as used herein is a generic term meant to encompass any of a number of types of discrete subjects that may be compared to a set of requirements to rank the entities against the set (and/or subset) of requirements. One example of an entity includes any type of applicant that is evaluated against a set (and/or subset) of requirements. In one embodiment, an applicant-type of entity is an application for an employment or scholastic (e.g., a student) position at an employer or school, respectively. In both of these cases, an applicant is evaluated for suitability of the position (or academic institution seat) against a set of desired criteria ("requirements"). Another embodiment of an entity is that of a corporate organization submitting a response to a request for proposal (RFP). In this example, the one or more entities submitting responses to an RFP are evaluated as to their technical and financial competitiveness relative to a set of desired criteria. These examples of entities are presented for convenience of explanation. The techniques described herein may be applied to other types of entities.

A set of requirements used for training data (and for target data, described below) may be adapted according to the entities being ranked. At a generic level, a set of requirements may include financial requirements, performance requirements, types of experiences, experience levels, certifications (e.g., from accredited institutions or industry certification organizations), or other requirements. Specific embodiments of requirements may include attributes associated with an employment history (years of service, levels of responsibility, disciplinary record), academic credentials (years of schooling completed, degrees or certificates granted), capabilities (e.g., business functions such as billing, types of services or products provided), location, minimum and/or maximum bid price or estimated cost, and the like. Analogously, subsets of these requirements may include at least one, but generally not all, of the requirements in a set.

In some examples, a set of requirements may include a concise or well defined attribute and a corresponding attribute value (e.g., structured data). For example, an attribute for "minimum bid/maximum bid" may be associated with attribute values of "$100/$1000." In addition to a concise and/or standardized attribute name, the system may also apply natural language techniques to identify attributes and associated attribute values for an entity even if the entity provides data in a narrative form (e.g., unstructured data). For example, a narrative description in a response to a request for proposal may state "our best price is $775 and we will not exceed that amount by any more than 10%." The machine learning system, using natural language processing, topic extraction, and other machine learning training techniques, may correctly interpret this as attribute values of "$775/$850."

The "overall match score" included in the training data may quantify a degree of similarity between the attribute values for an entity as a whole and a (full) set of corresponding requirements. That is, the overall match score quantifies a wholistic similarity between the attribute values for an entity and a set of corresponding requirements. As described above, this overall match score may, in some examples, be used as an initial filtering process that separates more relevant entities from less relevant entities. That is, in some examples, the overall match score may serve as an initial process by which data may be reviewed and/or analyzed at a coarse level of detail that includes the full sets of entity attributes and corresponding requirements and is not limited to subsets thereof. In some examples, the match score may be calculated using any of a variety of similarity scores that include, but are not limited to, cosine similarity techniques.

In some examples, the system may first generate match scores individually for a set of attributes associated with an entity and corresponding requirements of the set of requirements. The system may then generate the overall match score for an entity as a whole using these individual attribute match scores. In some examples, an overall match score for an entity as a whole may be generated by generating an average, a weighted average, or a sum of the match scores for the particular individual attributes.

Once the system has generated an overall match score, the system may apply a label to the training data set thereby quantifying the degree of match between entity attributes/ attribute values and a corresponding set of requirements, as a whole.

In some examples, the ranking match score is generated based on an analysis and resulting degree of matching between a subset of entity attributes and a corresponding subset of requirements. The generation of the ranking match score thus quantifies or indicates a similarity between the subset of entity attributes (that may be more relevant to an analysis or of greater interest to a user) for a subset of entities (filtered using the overall match score) and a corresponding subset of requirements. In some examples, ranking entities according to a ranking match score may improve the accuracy, relevance, and/or aptness of the analysis executed by the trained ML model compared to using an overall match score. The ranking match score may be generated using any of the techniques described above in the context of the overall match score, and merely applied to an indicated subset of entity attributes and a corresponding subset of requirements.

The data described in the operations 212, 216, 220 may be used to train a machine learning model using the techniques described above in the context of FIG. 1.

Once trained, the system may apply the trained machine learning model to target entity data filter and rank entities based on a target set of requirements (operation 224). The system may execute this filtering and ranking of entities using techniques described above, and as illustrated further in FIG. 3.

Figure 3:
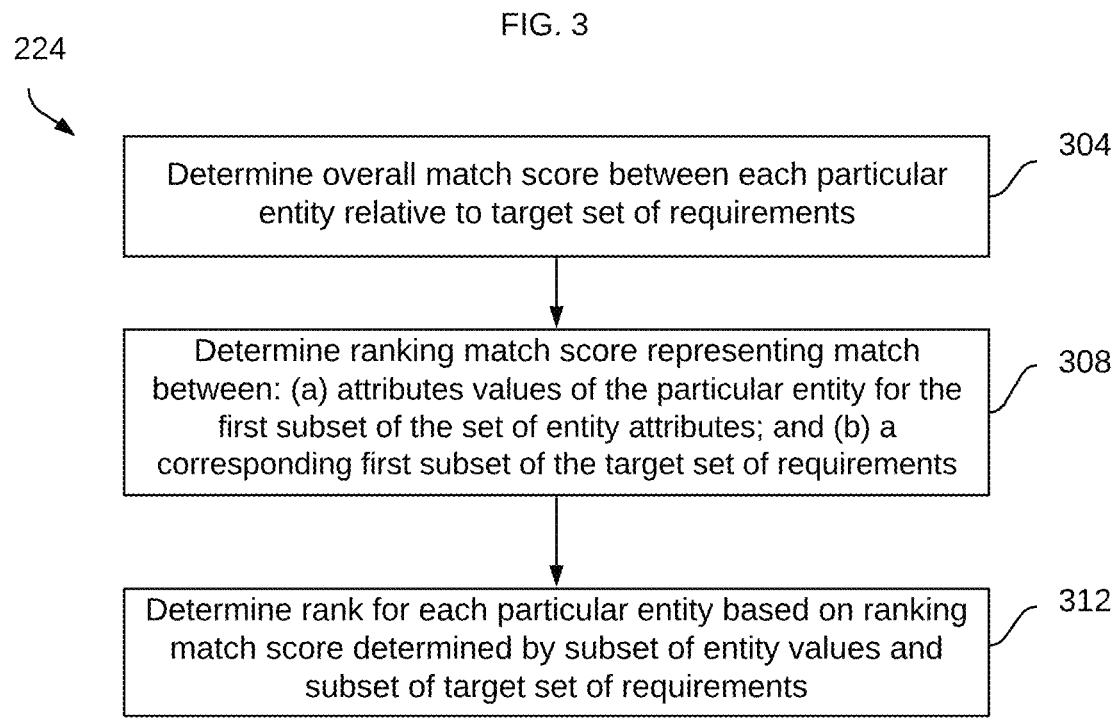
FIG. 3 illustrates an example set of operations for generating ranking match scores of entities and using the ranking match score to generate entity rankings in accordance with one or more embodiments.

Turing briefly to FIG. 3, the operation 224 may begin by first determining an overall match score between each individual entity of a plurality of entities and a target set of requirements (operation 304). The operation 224 is performed using techniques analogous to those described above for generating an overall match score for the purpose of training a machine learning model. For example, the trained machine learning model may receive entity data and identify attributes and/or attribute values within the entity data for each of the entities of the plurality of entities. In examples in which the entity data is provided in an unstructured format, the system may apply natural language processing techniques to identify attributes and/or corresponding attribute values within the entity data. The system may analyze structured data (e.g., such as data submitted via a form) by abstracting values from corresponding attribute locations within the structure.

The system may then generate an overall match score for a particular entity in light of a target set of requirements (operation 304). The system may generate an overall match score (e.g., using a cosine similarity technique) for a particular entity as a whole relative to the target set of requirements. In one example, this may be done by collectively analyzing a similarity between the collective attribute values for a particular entity and the collective corresponding target set of requirements. In another example, the system may generate the overall match score by generating individual match scores between individual requirements in the target set of requirements and corresponding entity attributes. Then, these individual match scores may be averaged, averaged with differing weights, and/or summed to generate an entity-level overall match score relative to the entire target set of requirements. These calculations may, in some cases, not be used when the match score is a binary value. The system may repeat this process for some or all of the entities evaluated relative to the set of requirements.

In some examples, the overall match score may be used for an initial filtering and/or selection of entities relative to a set of requirements. In some examples, a plurality of entities may be initially filtered according to an overall match score. In these examples, the system may execute additional analyses (e.g., a ranking match score analysis) on data corresponding to entities having an overall match score above a threshold.

The system may then generate a ranking match score for one or more of the entities of the plurality of entities (operation 308). In some examples, the entities analyzed using the ranking match score are a subset of entities that are filtered from a set of entities using the overall match score. As described above, a ranking match score may represent an extent or degree of matching between, and be generated based on, (a) attribute values for a subset of attributes for a particular entity and (b) a corresponding subset of requirements of the target set of requirements. In some examples, one of the subset of attributes for a particular entity or the corresponding subset of requirements may be selected by a user and the other one of the subset of attributes for a particular entity or the corresponding subset of requirements may be identified using character and/or field matching (e.g., for structured data) and/or natural language processing.

In some specific embodiments, a ranking match score may be based on a subset of sections in a document (e.g., a resume, an RFP) that are compared to a corresponding subset of sections in a requirements list. Each of the compared subset of sections in the document is evaluated for similarity against a corresponding section in the requirements list, such as through a cosine similarity calculation. The similarity scores of the compared subsets may then be combined (e.g., a sum, an average, a weighted sum, a weighted average) to generate a ranking match score.

Regardless of how the correspondence between the subset of attributes and the subset of requirements is established, the ranking match score may be generated using any of the techniques described above. For example, the system may generate the ranking match score using a similarity score (e.g., cosine similarity) to compare individual attributes of the subset of attributes to corresponding individual requirements of the subset of requirements. The system may then generate the ranking match score using the individual similarity scores by generating an average, a weighted average, a sum, a weighted sum, or other computed outcome that represents a degree of matching between the subset of attributes and the subset of requirements.

Upon generating ranking match scores for analyzed entities (e.g., optionally selected based on an overall match score above a threshold value), the system may use the ranking match scores to determine a rank for the analyzed entities in light of the subset of target requirements (operation 312). The system may execute the ranking by applying an order to entities based on a progression of highest value of ranking match score to lowest match score, or vice versa. In some examples, a rank identifier from a set of sequential rank identifiers (e.g., 1, 2, 3) may be assigned to each ranked entity.

Returning to FIG. 2, the system may then generate a graphical user interface (GUI) that presents individual interface elements, each of which represents a corresponding entity (operation 228). The interface elements may be positioned within the GUI based on, at least in part, an entity rank that is based on a corresponding ranking match score (operation 228). The GUI may have any of a number of configurations that are generically referred to as a "ranked array." In one example of a ranked array, the individual interface elements that correspond to entities may be arranged in a list format in which a first interface element associated with a highest ranking match score is at a top of the GUI list and a second interface element associated with a lowest ranking match score is at a bottom of the GUI list (opposite the top). In another example of a ranked array, the individual interface elements may be arranged in a grid. In one embodiment, decade tiers of match ranking scores (e.g., 90-100, 80-89, 70-79) are arranged in rows of the grid and individual units within the decade (e.g., 90-92, 93-94) are arranged in columns.

In some examples, individual user interface elements may include an indication of one or more attributes that are contributing to an overall ranking match score for a particular corresponding entity. For example, individual user interface elements may include a graphic element, such as a that identifies a subset of the set of requirements contributing to a ranking match score for a particular entity. In some examples, individual user interface elements may include a graphic element, such as a pie chart that identifies a subset of the set of requirements contributing to a ranking match score for a particular entity, and their respective proportional contribution. In still other examples, individual user interface elements may include other and/or additional graphic effect, such as shading and/or color schemes. These are described below in additional detail in the context of FIGS. 4 and 5.

After presenting a GUI as described above in the operation 228, the system may receive user input that re-orders one or more user interface elements corresponding to one or more entities within the GUI (operation 232). More specifically, the system may receive input that moves one interface element from a first location within the GUI (e.g., the ranked list or grid) to a second, different location within the GUI. Locations within the GUI are associated with ranking match scores. For example, a second ranking match score for the first user interface element moved to the second location may be generated based on a ranking match score associated with one or more neighboring user interface elements. If the second location for the first user interface element is between two other user interface elements, the second match score for the first user interface element may be an average value of the ranking match scores of the neighboring user interface elements. In another example, the second ranking match score for the first user interface element may be based on a cosine similarity score with one or more neighboring user interface elements. In still other embodiments, the system may re-calculate attribute weights based on the re-located interface element and apply the re-calculated weights to a revised ranking match score.

In some examples, the system may identify a revised subset of attributes (e.g., a second subset different from the first subset of attributes) on which to base a computation of a ranking match score (operation 236). That is, upon receiving the user input of operation 232, the system may identify a new subset of entity attributes that is consistent with the revised order. In some examples, this may include adding an attribute to the subset that previously was not included. In some examples, this may include removing one or more attributes previously in the subset (e.g., the first subset) and replacing the removed one or more attributes with new attributes not previously included in the (first) subset. In some example, this may include simply removing one or more attributes from the (first) subset and not replacing them. In some examples, the system may revise one or more weights associated with corresponding attributes in the (first) subset so as to generate a ranking match score for the new (second) subset that matches with the new order of interface elements.

The system may then generate new training data that reflects the second (i.e., revised) ranking match score for the first entity that is based on the second location for the corresponding user interface element (operation 240). In some examples, the system may update a corresponding label in the training data with the second match score that corresponds to the second location of the first user interface element. In some examples, the system may re-execute the operation 224, and subsequent operations, based on the new training data.

In some examples, the system is configured to accommodate individual preferences. For example, different users of the system may have corresponding different user profiles that store corresponding revisions to the training data. While the system may be trained with a common training data set, different user inputs provided by different users may be stored in corresponding user profiles. These may be used to re-train or otherwise modify the calculations by which different attributes are weighted to form a ranked array of entities.

Regardless, the updates to the training data may be used to re-train a machine learning model so that rankings associated with the new training data are reflected in future computations (operation 240). The same training techniques described above may be applied to operation 240.

4. Example Embodiment

Detailed examples are described below for purposes of clarity. Components and/or operations described below should be understood as one specific example which may not be applicable to certain embodiments. Accordingly, components and/or operations described below should not be construed as limiting the scope of any of the claims.

Figure 4A:
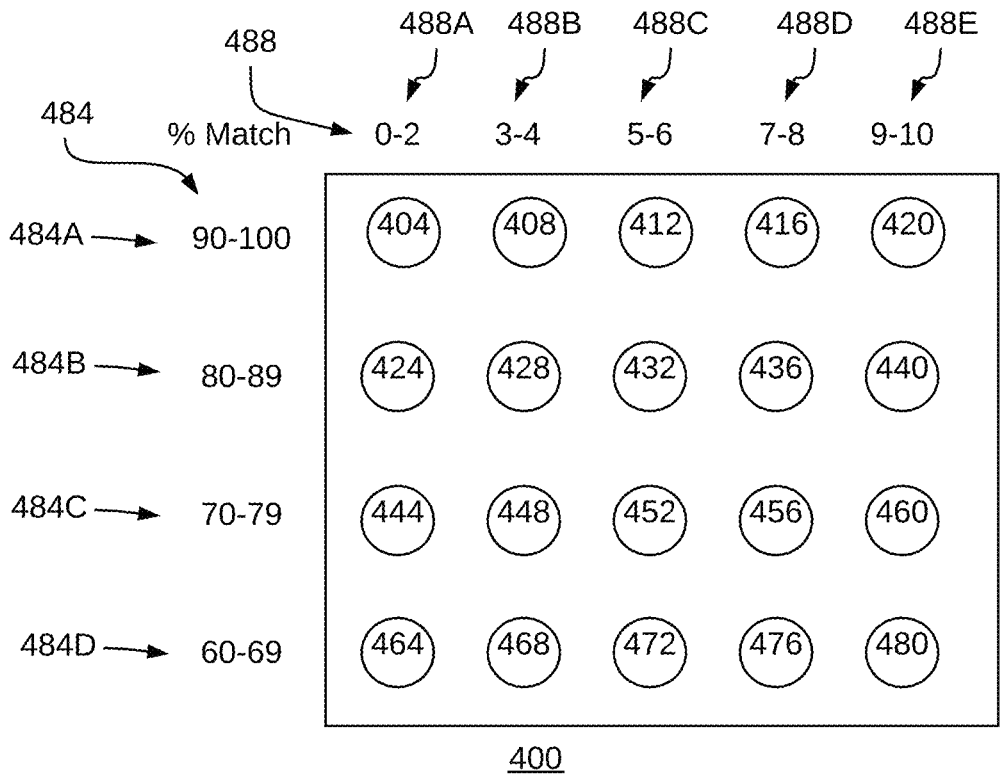
FIGS. 4A and 4B illustrate an example graphic user interface displaying a ranked array of user interface elements placed in an order based on ranking match scores that may be used to update a ranking match score analysis by repositioning interface elements within the graphic user interface in accordance with one or more embodiments.

FIG. 4A illustrates an example graphical user interface (GUI) 400 that includes a number of user interface elements 404-480. Each of the user interface elements 404-480 correspond to an entity and are arranged in the GUI 400 in a ranked array that reflects a ranking match score between a subset of attribute values of the entity and a subset set of requirements. An initial filtering of a set of entities based on overall match score that resulted in a subset of entities corresponding to the interface elements 404-480 from a larger set of entities is omitted for clarity.

In this example, the ranked array of user interface elements 404-480 is arranged in a grid format. In this example format, a user may identify a percentage match of a particular entity and/or patterns of matches within a group of ranked entities with a glance. Rows 484A-484D (collectively 484) identify decade "tiers" of a percentage match. Columns 488A-488E (collectively 488) identify a finer graduation of match within the tiers. As described above, the ranking match scores are generated based on a subset of entity attributes in light of a subset of requirements.

As illustrated, row 484A identifies user interface elements 404, 408, 412, 416, and 420 as having a ranking match score from 90% to 100%. Row 488A indicates that user interface element 404 has a ranking match score from 90% to 92%. Row 488B indicates that user interface element 408 has a match score from 93% to 94%. Row 488C indicates that user interface element 412 has a ranking match score from 95% to 96%. Row 488D indicates that user interface element 416 has a ranking match score from 97% to 98%. Row 488E indicates that user interface element 416 has a ranking match score from 99% to 100%.

Figure 4B:
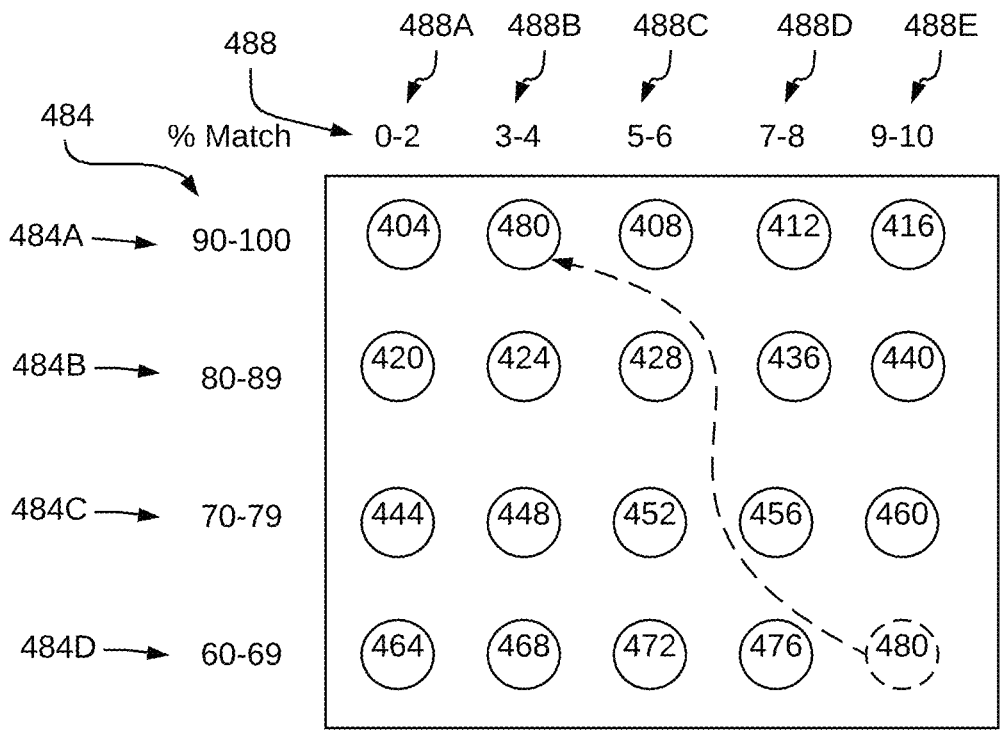

FIG. 4B illustrates the process by which the system may receive user input that re-orders one or more of the user interface elements, thereby providing new data to the trained machine learning model (e.g., as described in the context of the operation 232). This new data may be instantiated as a new training data set that is used to re-train the model so that it emphasizes (e.g., recalculates weights) attributes differently in light of the set of requirements.

As schematically illustrated by a dashed arrow in the GUI 490 of FIG. 4B, interface element 480 is repositioned, in response to receiving user input, from its existing position within the GUI 400 to a new position within row 484A and column 488B. User interface element 432 is removed from the analysis. As described above, this new position generates a new ranking (a higher ranking match score than adjacent interface element 408) for the entity corresponding to the interface element 480. The system then applies the new ranking match score to generate new training data or update existing training data, which may be used to re-train the machine learning model.

Figure 5:
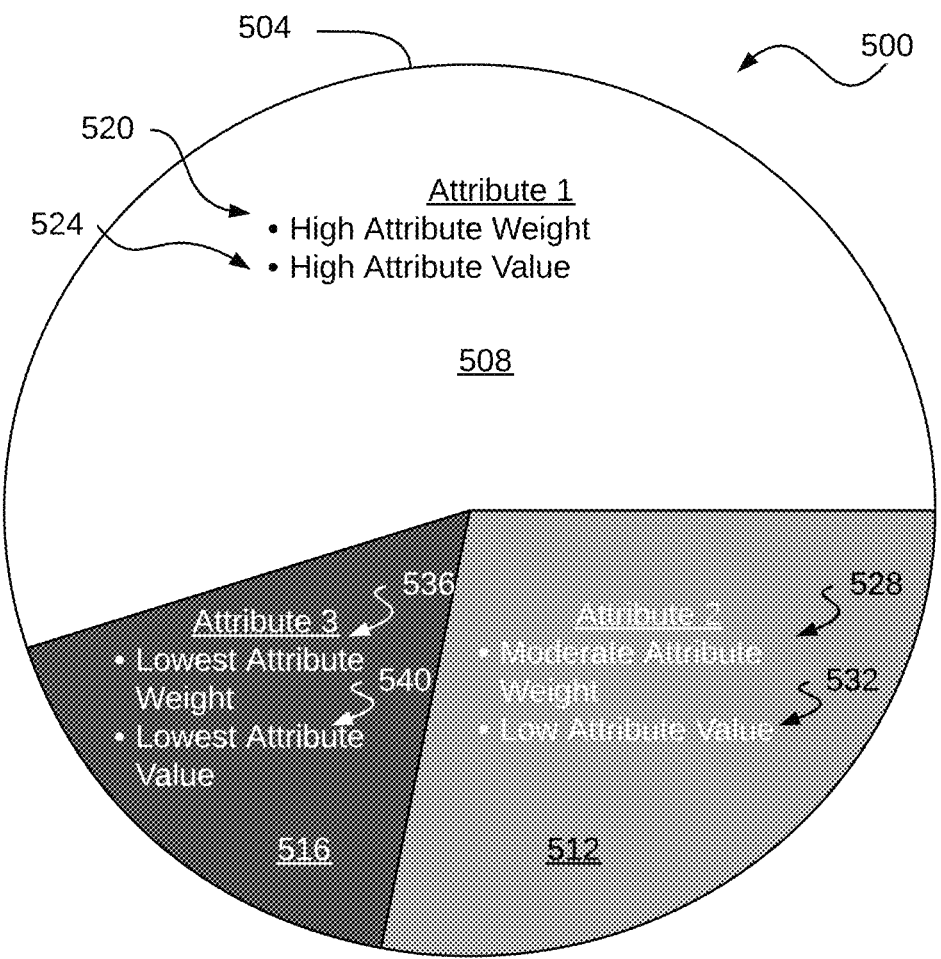
FIG. 5 illustrates an example user interface element that identifies information relevant to a particular ranking match score in accordance with one or more embodiments.
Figure 5:
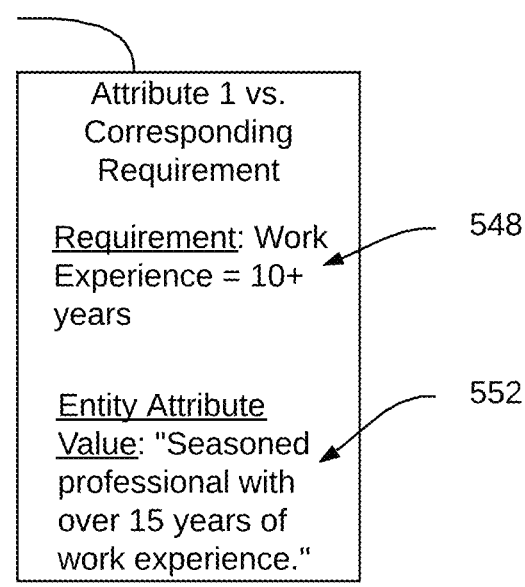

FIG. 5 illustrates on example of an interface element 500 corresponding to an entity. The system may use interface elements similar to the interface element 500 to convey more detailed information about entities relative to a subset of requirement within a GUI, such as the GUI 400. As illustrated, the interface element may actually include two features, a first feature 504 and a second feature 544.

The first feature 504 of the interface element 500 may graphically illustrate one or more of (1) a subset of attributes contributing to a ranking match score; (2) proportional contributions of the subset of attributes to the ranking match score; and/or (3) an indication of whether each of the proportional contributions to the ranking match score is due to a weight assigned to a corresponding attribute and/or a value of the attribute exhibited by the entity.

In the example of the first feature 504 illustrated in FIG. 5, the relative proportions of attributes to a ranking match score (e.g., used to position the interface element 500 within a GUI, such as GUI 400) are illustrated as sections 508, 512, and 516. This "pie chart" style depiction is presented for convenience of illustration. The system may use other types of proportional representations, whether a bar chart, a list of percentages, a "heat map" graphic, among others.

As shown, section 508 corresponds to "attribute 1" of the subset of attributes used to generate a ranking match score (e.g., relative to a target subset of requirements). The pie chart-style first feature 504 indicates, using the size of the section 508, that "attribute 1" contributes the most to the ranking match score. Another interpretation of this depiction is that "attribute 1" has a highest attribute score relative to a corresponding requirement of the subset of requirements compared to the other attributes used to generate a ranking match score.

The section 508 also includes two descriptions that provide additional information about the calculation used to generate the score associated with "attribute 1." Description 520 indicates that "attribute 1" has a high weight in the ranking match score calculation (i.e., a greatest weight). That is, the system recognizes that "attribute 1" is more important relative to other attributes by applying a higher weight to a value for "attribute 1" in the ranking match score calculation than for other attributes. Description 524 indicates that the attribute value associated with the entity and corresponding to "attribute 1" is high. In this way, descriptions 520 and 524 provide information that indicate that "attribute 1" is an important attribute in the ranking score calculation and for which the corresponding entity exhibit a high attribute value.

Similar information is displayed in section 512 for "attribute 2." As shown, "attribute 2" has a second highest contribution to the ranking match score. This is based on descriptions 528 and 532, which indicate that the attribute has a moderate weight (e.g., between a highest applied weight value and a lowest applied weight value, within a range of 20% to 80% of the full range of attribute weight values) and a low attribute value.

Section 516 contributes the least to the ranking match score as illustrated by its corresponding smallest "slice" of the pie chart. Descriptions 536 and 540 indicate that "attribute 3" has a low weight in the ranking match score calculation (e.g., a lowest applied weight value, within a range of 0% to 20% of the full range of attribute weight values) and the entity exhibits a low attribute value for "attribute 3."

The second feature 544 of the interface element 500 may provide even more specific information regarding some of the attributes, attribute values, and subset of requirements contributing to high ranking match score. The second feature 544 displays a requirement 548, such as a heavily weighted requirement from a subset of requirements, and a corresponding entity attribute value 552. This improves the utility of the system by displaying a requirement and a corresponding attribute value adjacent to one another. In this example, the requirement 548 and a corresponding attribute value 552 are presented for a user to examine directly.

In some examples, the second feature 544 may present attribute values within a context of the data in which they appear. For example, the second feature 544 may identify a relevant attribute value in target data (e.g., structured or unstructured data analyzed by the system) and present the attribute value within the sentence, paragraph, section, or form field/section in which the attribute value appears.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used in this section refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
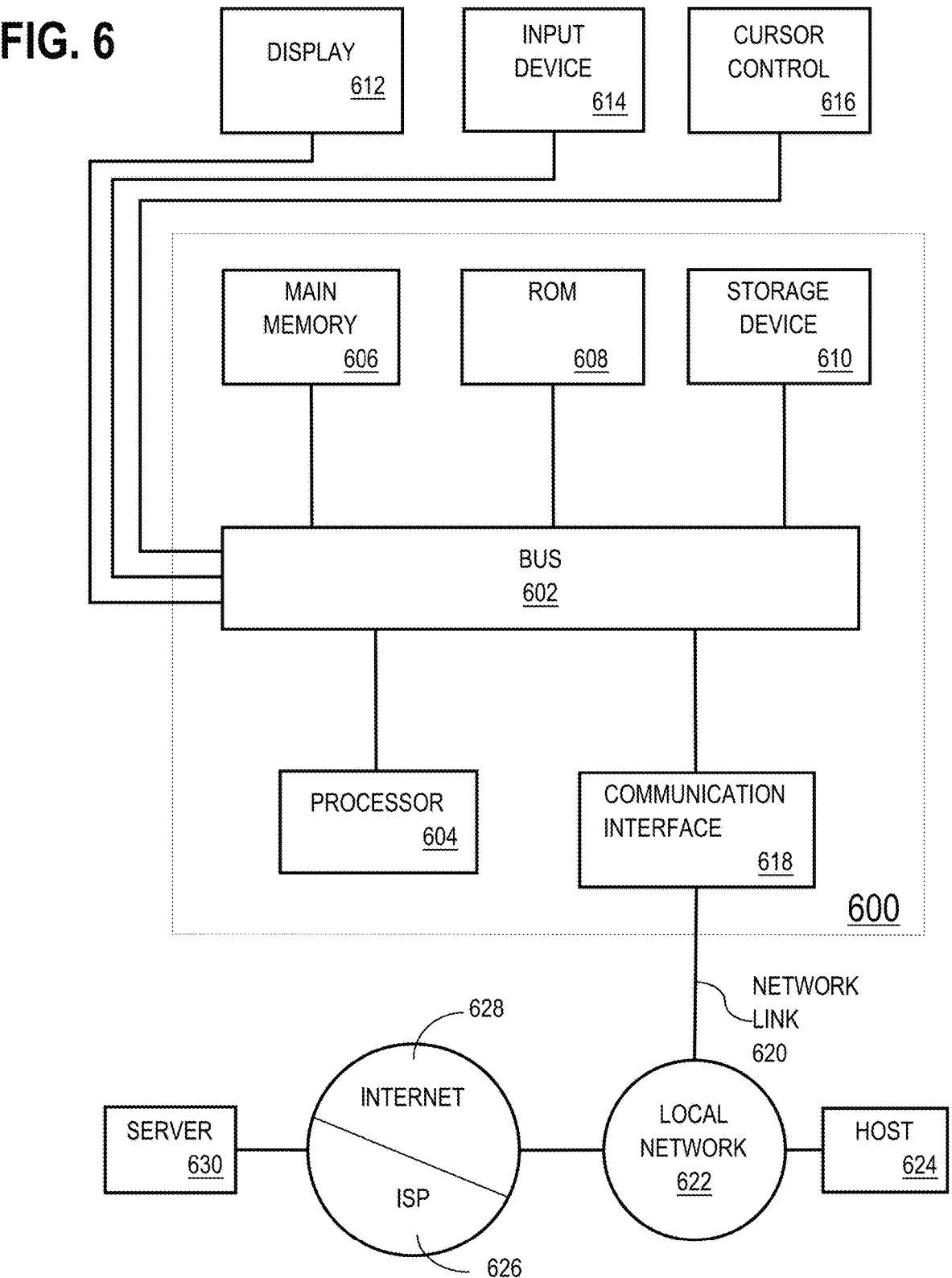
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause performance of operations comprising:
   training a machine learning model to filter and rank entities based on a set of requirements at least by:
      obtaining training data sets, each training data set comprising:
         attribute values for a set of entity attributes;
         a particular set of requirements;
         an overall match score representing the match between (a) the attribute values for the set of entity attributes and (b) the particular set of requirements;
         a ranking match score representing the match between (a) the attributes values for a first subset of the set of entity attributes and (b) a corresponding first subset of the particular set of requirements;
      training the machine learning model based on the training data sets;
   applying the machine learning model to a plurality of entities to filter and rank the plurality of entities based on a target set of requirements, the applying generating a ranked subset of entities from the plurality of entities, wherein for each particular entity of the ranked subset of entities:
      the machine learning model determines an overall match score based on attribute values of the particular entity for the set of entity attributes and the target set of requirements;
      the machine learning model determines a ranking match score representing the match between (a) attributes values of the particular entity for the first subset of the set of entity attributes and (b) a corresponding first subset of the target set of requirements;
      the machine learning model determines a rank of the particular entity, among the plurality of entities, based on the ranking match score;
   presenting a Graphical User Interface (GUI) comprising a plurality of interface elements respectively representing the ranked subset of entities, wherein the plurality of interface elements are presented in a first order corresponding to the ranking match scores of the respective ranked subset of entities,
   wherein the GUI comprises at least one interface feature indicating (a) a proportional contribution to the ranking match score of at least one corresponding attribute and (b) a degree of similarity between the at least one corresponding attribute and at least one corresponding entity attribute value;

receiving user input modifying the first order of the plurality of interface elements to a second order of the plurality of interface elements;

identifying a second subset of the set of entity attributes for computing ranking match scores for the ranked subset of entities that would result in ranking match scores for the ranked subset of entities corresponding to the second order for the respective plurality of interface elements; and re-training the machine learning model to compute ranking match scores such that the ranking match scores represent the match between (a) attribute values of entities for the second subset of the set of entity attributes and (b) a corresponding second subset of any set of requirements.

2. The media of claim 1, wherein the at least one interface feature comprises at least one shaded region indicating (a) the proportional contribution to the ranking match score of at least one corresponding attribute and (b) the degree of similarity between the at least one corresponding attribute and at least one corresponding entity attribute value.

3. The media of claim 2, wherein re-training the machine learning model further comprises altering a size of the at least one shaded region indicating the proportional contribution to the ranking match score of the corresponding attributes.

4. The media of claim 1, wherein at least one interface element further comprises a display of a first requirement and a corresponding entity attribute value.

5. The media of claim 1, wherein at least some of the interface elements of the plurality of interface elements comprise an interface sub-element displaying a particular attribute of the ranked subset of entity attributes having a highest attribute score relative to a corresponding requirement of the second subset of requirements.

6. The media of claim 1, wherein at least some of the interface elements display a particular attribute value corresponding to a particular requirement of the second subset of requirements.

7. The media of claim 6, wherein the particular attribute value comprises a similarity score above a threshold value relative to the particular requirement.

8. The media of claim 1, wherein applying the machine learning model to the plurality of entities further comprises:
comparing, to a threshold value, the overall match scores corresponding to the entities of the plurality of entities;
associating entities having an overall match score of at least the threshold value with a subset of entities; and
wherein the subset of entities is ranked using the ranking match score to generate the ranked subset of entities.

9. The media of claim 1, wherein modifying the first order the first order of the plurality of interface elements to a second order of the plurality of interface elements causes recomputation of ranking match scores for the ranked subset of entities and does not cause a recomputation of overall match scores for the ranked subset of entities or for the plurality of entities.

10. A method comprising:
training a machine learning model to filter and rank entities based on a set of requirements at least by:
obtaining training data sets, each training data set comprising:
attribute values for a set of entity attributes;
a particular set of requirements;
an overall match score representing the match between (a) the attribute values for the set of entity attributes and (b) the particular set of requirements;
a ranking match score representing the match between (a) the attributes values for a first subset of the set of entity attributes and (b) a corresponding first subset of the particular set of requirements;
training the machine learning model based on the training data sets;
applying the machine learning model to a plurality of entities to filter and rank the plurality of entities based on a target set of requirements, the applying generating a ranked subset of entities from the plurality of entities, wherein for each particular entity of the ranked subset of entities:
the machine learning model determines an overall match score based on attribute values of the particular entity for the set of entity attributes and the target set of requirements;
the machine learning model determines a ranking match score representing the match between (a) attributes values of the particular entity for the first subset of the set of entity attributes and (b) a corresponding first subset of the target set of requirements;
the machine learning model determines a rank of the particular entity, among the plurality of entities, based on the ranking match score;
presenting a Graphical User Interface (GUI) comprising a plurality of interface elements respectively representing the ranked subset of entities, wherein the plurality of interface elements are presented in a first order corresponding to the ranking match scores of the respective ranked subset of entities, p1 wherein the GUI comprises at least one interface feature indicating (a) a proportional contribution to the ranking match score of at least one corresponding attribute and (b) a degree of similarity between the at least one corresponding attribute and at least one corresponding entity attribute value;
receiving user input modifying the first order of the plurality of interface elements to a second order of the plurality of interface elements;
identifying a second subset of the set of entity attributes for computing ranking match scores for the ranked subset of entities that would result in ranking match scores for the ranked subset of entities corresponding to the second order for the respective plurality of interface elements; and
re-training the machine learning model to compute ranking match scores such that the ranking match scores represent the match between (a) attribute values of entities for the second subset of the set of entity attributes and (b) a corresponding second subset of any set of requirements.

11. The method of claim 10, wherein the at least one interface feature comprises at least one shaded region indicating (a) the proportional contribution to the ranking match score of at least one corresponding attribute and (b) the degree of similarity between the at least one corresponding attribute and at least one corresponding entity attribute value.

12. The method of claim 11, wherein re-training the machine learning model further comprises altering a size of the at least one shaded region indicating the proportional contribution to the ranking match score of the corresponding attributes.

13. The method of claim 10, wherein at least one interface element further comprises a display of a first requirement and a corresponding entity attribute value.

14. The method of claim 10, wherein at least some of the interface elements of the plurality of interface elements comprise an interface sub-element displaying a particular attribute of the ranked subset of entity attributes having a highest attribute score relative to a corresponding requirement of the second subset of requirements.

15. The method of claim 10, wherein at least some of the interface elements display a particular attribute value corresponding to a particular requirement of the second subset of requirements.

16. The method of claim 15, wherein the particular attribute value comprises a similarity score above a threshold value relative to the particular requirement.

17. The method of claim 15, wherein applying the machine learning model to the plurality of entities further comprises:
comparing, to a threshold value, the overall match scores corresponding to the entities of the plurality of entities;
associating entities having an overall match score of at least the threshold value with a subset of entities; and
wherein the subset of entities is ranked using the ranking match score to generate the ranked subset of entities.

18. The method of claim 15, wherein modifying the first order the first order of the plurality of interface elements to a second order of the plurality of interface elements causes recomputation of ranking match scores for the ranked subset of entities and does not cause a recomputation of overall match scores for the ranked subset of entities or for the plurality of entities.

19. A system comprising:
at least one device including a hardware processor;
the system being configured to perform operations comprising:
training a machine learning model to filter and rank entities based on a set of requirements at least by:
obtaining training data sets, each training data set comprising:
attribute values for a set of entity attributes;
a particular set of requirements;
an overall match score representing the match between (a) the attribute values for the set of entity attributes and (b) the particular set of requirements;
a ranking match score representing the match between (a) the attributes values for a first subset of the set of entity attributes and (b) a corresponding first subset of the particular set of requirements;
training the machine learning model based on the training data sets;
applying the machine learning model to a plurality of entities to filter and rank the plurality of entities based on a target set of requirements, the applying generating a ranked subset of entities from the plurality of entities, wherein for each particular entity of the ranked subset of entities:
the machine learning model determines an overall match score based on attribute values of the particular entity for the set of entity attributes and the target set of requirements;
the machine learning model determines a ranking match score representing the match between (a) attributes values of the particular entity for the first subset of the set of entity attributes and (b) a corresponding first subset of the target set of requirements;
the machine learning model determines a rank of the particular entity, among the plurality of entities, based on the ranking match score;
presenting a Graphical User Interface (GUI) comprising a plurality of interface elements respectively representing the ranked subset of entities, wherein the plurality of interface elements are presented in a first order corresponding to the ranking match scores of the respective ranked subset of entities,
wherein the GUI comprises at least one interface feature indicating (a) a proportional contribution to the ranking match score of at least one corresponding attribute and (b) a degree of similarity between the at least one corresponding attribute and at least one corresponding entity attribute value;
receiving user input modifying the first order of the plurality of interface elements to a second order of the plurality of interface elements;
identifying a second subset of the set of entity attributes for computing ranking match scores for the ranked subset of entities that would result in ranking match scores for the ranked subset of entities corresponding to the second order for the respective plurality of interface elements; and
re-training the machine learning model to compute ranking match scores such that the ranking match scores represent the match between (a) attribute values of entities for the second subset of the set of entity attributes and (b) a corresponding second subset of any set of requirements.

20. The method of claim 19, wherein the at least one interface feature comprises at least one shaded region indicating (a) the proportional contribution to the ranking match score of at least one corresponding attribute and (b) the degree of similarity between the at least one corresponding attribute and at least one corresponding entity attribute value.

* * * * *

UNITED STATES PATENT AND TRADEMARK OFFICE
CERTIFICATE OF CORRECTION

| | | |
|---|---|---|
| PATENT NO. | : 12,260,303 B2 | Page 1 of 1 |
| APPLICATION NO. | : 17/178365 | |
| DATED | : March 25, 2025 | |
| INVENTOR(S) | : Nimavat et al. | |

It is certified that error appears in the above-identified patent and that said Letters Patent is hereby corrected as shown below:

In the Specification

In Column 3, Line 67, delete "120" and insert -- 120. --, therefor.

In Column 24, Line 31, in Claim 10, after "entities," delete "p1".

In Column 26, Line 44, in Claim 20, delete "method" and insert -- system --, therefor.

Signed and Sealed this
Twenty-fourth Day of June, 2025

Coke Morgan Stewart
*Acting Director of the United States Patent and Trademark Office*